United States Patent [19]

Inagaki et al.

[11] Patent Number: 4,914,001

[45] Date of Patent: * Apr. 3, 1990

[54] OPTICAL INFORMATION RECORDING MEDIUM

[75] Inventors: Yoshio Inagaki; Masayoshi Tsuboi; Yoshiaki Suzuki, all of Minami-Ashigara, Japan

[73] Assignee: Fuji Photo Film Co., Ltd., Kanagawa, Japan

[ * ] Notice: The portion of the term of this patent subsequent to Jul. 25, 2006 has been disclaimed.

[21] Appl. No.: 109,394

[22] Filed: Oct. 19, 1987

[30] Foreign Application Priority Data

Oct. 20, 1986 [JP] Japan .................................. 61-248978
Nov. 12, 1986 [JP] Japan .................................. 61-268821

[51] Int. Cl.$^4$ .................. G11B 7/24; G03C 5/16; G01D 9/00; B41M 5/26
[52] U.S. Cl. .................................. 430/270; 430/495; 430/945; 346/135.1
[58] Field of Search .................. 430/270, 495, 945; 346/135.1

[56] References Cited

U.S. PATENT DOCUMENTS

| | | | |
|---|---|---|---|
| 4,626,496 | 12/1986 | Sato | 430/270 |
| 4,730,902 | 3/1988 | Suzuki et al. | |
| 4,735,889 | 4/1988 | Namba et al. | 430/273 |
| 4,761,181 | 8/1988 | Suzuki | |
| 4,763,966 | 8/1988 | Suzuki et al. | |
| 4,767,571 | 8/1988 | Suzuki et al. | |
| 4,791,023 | 12/1988 | Suzuki et al. | |

FOREIGN PATENT DOCUMENTS 14988 1/1986 Japan .
89891 5/1986 Japan .

Primary Examiner—Paul R. Michl
Assistant Examiner—Mark R. Buscher
Attorney, Agent, or Firm—Birch, Stewart, Kolasch & Birch

[57] ABSTRACT

An optical recording medium comprising a support carrying thereon a dye and at least one of the quenchers represented by the general formula (I) or (II)

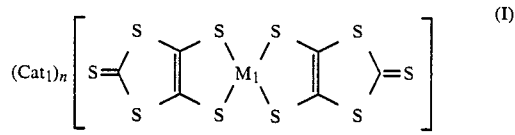

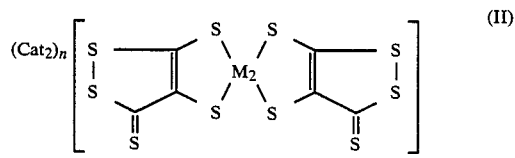

wherein $(Cat_1)$ and $(Cat_2)$ respectively represent a cation necessary for making the complex neutral, $M_1$ and $M_2$ respectively represent nickel, copper, cobalt, palladium or platinum, and n represents 1 or 2, is offered.

The optical recording medium has a smaller deterioration during reproduction, in other words is superior in reading durability, and is at the same time superior in stability in preservation, as compared with the optical recording medium of the prior art.

18 Claims, No Drawings

OPTICAL INFORMATION RECORDING MEDIUM

BACKGROUND OF THE INVENTION

1. Field of the Invention

The present invention relates to an optical information recording medium (hereinafter referred to as an optical recording medium) of the heat mode type, and more specifically to an optical recording medium containing a specific compound as a quencher.

2. Description of the Prior Art

An optical recording medium of heat mode type utilizes recording light as the heat. An example of such a medium is a pit-forming type of medium where information is recorded by melting and removing parts of the medium with recording light such as a laser to form a pit, and the reading of a record is conducted by detecting this pit with reading light.

Various dyes or combinations of dyes with resins have been used in a recording layer of such optical recording media. However, such optical recording media have drawbacks such that the sensitivity or C/N ratio thereof is lowered by repeated erasing, repeated irradiation of reading light or long term preservation. Therefore, in order to improve light stability of the dye and to especially prevent decolorization owing to reading light (deterioration during reproduction), it has been proposed to use a dye and a quencher together (see, for example, Japanese Patent Published Unexamined Application (hereinafter referred to as J.P. KOKAI) Nos. 60-162691, 60-201988, 60-203488 and 60-257290).

However, even by combination with a quencher the durability of the optical recording medium against reading light, or the stability thereof during long term preservation has not yet been adequately satisfied from a practical point of view.

SUMMARY OF THE INVENTION

Accordingly, an object of the present invention is to provide an optical recording medium which has good durability against repeated irradiation by reading light and excellent stability during preservation.

The above object of the present invention has been accomplished by an optical recording medium comprising a support carrying thereon a dye and as a quencher at least one of the compounds represented by formula (I) or (II):

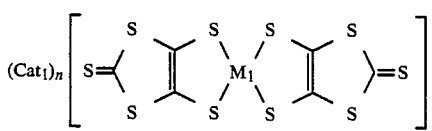

(I)

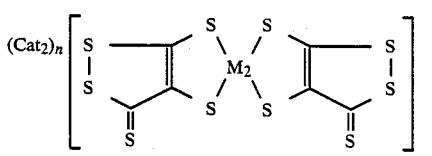

(II)

wherein (Cat$_1$) and (Cat$_2$) respectively represent a cation necessary for making the compound neutral, M$_1$ and M$_2$ respectively represent nickel, copper, cobalt, palladium or platinum, and n represents 1 or 2.

DETAILED DESCRIPTION OF THE INVENTION

The present invention is explained in more detail below.

Examples of an inorganic cation in the cation represented by (Cat$_1$) or (Cat$_2$) in the aforesaid general formula (I) or (II) include alkali metal ions such as Li$^+$, Na$^+$ and K$^+$, alkaline earth metal ions such as Mg$^{2+}$, Ca$^{2+}$ and Ba$^{2+}$, and NH$_4^+$.

Further, examples of an organic cation therein include quaternary ammonium ions and quaternary phosphonium ions.

Preferred cations among the above cations (Cat$_1$) and (Cat$_2$) are those represented by the following general formula (III-a), (III-b), (III-c), (III-d) or (III-e):

(III-a)

(III-b)

(III-c)

(III-d)

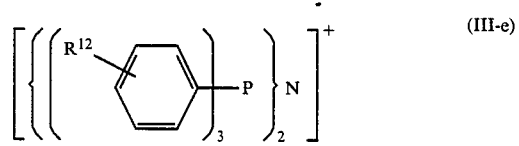

(III-e)

wherein, R$^1$, R$^2$, R$^3$, R$^4$, R$^5$, R$^6$, R$^7$, R$^8$, R$^9$, R$^{10}$, R$^{11}$ and R$^{12}$ respectively represent a substituted or unsubstituted alkyl group having 1 to 20 carbon atoms, or a substituted or unsubstituted aryl group having 6 to 14 carbon atoms, and Z$^1$ and Z$^2$ respectively represent a nonmetal atomic group which forms a five-membered or a six-membered ring together with a nitrogen atom or a phosphorus atom in each formula.

The above substituted or unsubstituted alkyl group having 1 to 20 carbon atoms includes, for example a methyl group, an ethyl group, a n-butyl group, an iso-amyl group, a n-dodecyl group and n-octadecyl group. The aryl group having 6 to 14 carbon atoms includes, for example a phenyl group, a tolyl group and an α-naphthyl group.

These alkyl groups and aryl groups may respectively be substituted with a cyano group, a hydroxyl group, an alkyl group having 1 to 20 carbon atoms (e.g., a methyl group, an ethyl group, an n-butyl group or an n-octyl group), an aryl group having 6 to 14 carbon atoms (e.g., a phenyl group, a tolyl group or an α-naphthyl group), an acyloxy group havig 2 to 20 carbon atoms (e.g., an acetoxy gorup, a benzoyl group or p-methoxybenzoyloxy group), an alkoxy group having 1 to 6 carbon atoms (e.g., a methoxy group, an ethoxy group, a propoxy group or a butoxy group), an aryloxy group (e.g., a phenoxy group or a tolyloxy group), an aralkyl group (e.g., a benzyl group, a phenethyl group or an amisil group), an alkoxycarbonyl group (e.g., a methoxycarbonyl group, an ethoxycarbonyl group or an n-butoxycarbonyl group), an aryloxycarbonyl group (e.g., a phenoxycarbonyl group or a tolyloxycarbonyl group), an acyl group (e.g., an acetyl group or a benzoyl group), an acylamino group (e.g., an acetylamino group or a benzoylamino group), a carbamoyl group (e.g., an N-ethylcarbamoyl group or an N-phenylcarbamoyl group), an alkylsulfonylamino group (e.g., a methylsulfonylamino group or a phenylsulfonylamino group), a sulfamoyl group (e.g., an N-ethylsulfamoyl group or an N-phenylsulfamoyl group), a sulfonyl group (e.g., a mesyl group or a tosyl group) or the like.

$Z^1$ and $Z^2$ respectively represent a nonmetal atomic group necessary for forming a five-membered ring or a six-membered ring. The five-membered ring or six-membered ring may include a pyridine ring, an imidazole ring, a pyrrole ring, a 2-pyrroline ring, a pyrrolidine ring, a piperidine ring, a pyrazole ring, a pyrazoline ring, a imidazoline ring and the like.

Cations represented by the general formula (III-b) may include, for example, a dodecylpyridinium group, a hexadecylpyridinium group and a dodecylimidazolium group. Cations represented by the general formula (III-c) may include, for example, an N-ethyl-N-hexadecylpiperidinium group, an N-ethyl-N-dodecylpyrazolidinium group.

Cations preferably used in the present invention among cations represented by the above general formulae (III-a), (III-b), (III-c), (III-d) and (III-e) are (III-a), (III-b), (III-d) and (III-e) in view of availability of the raw materials and preparation cost.

The type of cations ($Cat_1$) and ($Cat_2$) has an influence on the solubilities of the compounds represented by the general formula (I) or (II) in organic solvents.

In general, when substituents bonding to the quaternary atom are alkyl groups, the solubility of the compound increases as the chain length of the alkyl groups become longer. This tendency is remarkable in the case of tetraalkyl substituted ammonium or tetraalkyl substituted phosphonium, cations having a total carbon number of 17 or more in the case of ammonium cations, and cations having a total carbon number of 4 or more in the case of phosphonium cations, respectively bestow high solubilities on the compounds.

Enumeration of $M_1$ or $M_2$ in the compounds represented by the aforesaid general formula (I) or (II) in order of preference is nickel, cobalt, copper, palladium and platinum.

The metal complexes of the general formula (I) or (II) have stereostructures of plane four coordination. Though it cannot be definitely determined whether the thioketone groups in the compounds of the general formula (II) exist symmetrically or unsymmetrically in relation to the center metal, the thioketone groups are represented for convenience's sake as in the general formula (II) in the present specification.

The compounds represented by the aforesaid general formula (I) or (II) may be synthesized as follows.

A compound of the general formula (I) (n=2): Disodium 1,3-dithiol-2-thione-4,5-dithiolate obtained by reacting carbon disulfide with sodium is converted to a zinc complex, and benzoyl chloride is reacted with the complex to form a bisbenzoylthio compound. After decomposition with an alkali, the bisbenzoylthio compound is reacted with a metal salt to obtain the captioned compound.

Further, a compound of the general formula (I) (n=1) may be obtained by oxidizing a complex obtained as above-described (n=2) with a proper oxidizing agent.

A compound of the general formula (II) (n=2): First, disodium 1,3-dithiol-2-thione-4,5-dithiolate obtained by reaction of carbon disulfide with sodium is heated to above 130° C. to isomerize it to disodium 1,2-dithiol-3-thione-4,5-dithiolate. Then, this dithiolate is converted to a zinc complex, and benzoyl chloride is reacted with the zinc complex to form a bisbenzoylthio compound, which is the decomposed with an alkali and reacted with a metal salt to obtain the captioned compound.

A compound of the general formula (II) (n=1) may be obtained by oxidizing the complex obtained as above-described (n=2) with a proper oxidizing agent.

Further, the 1,3-dithiol-2-thione-4,5-dithiolate anion which is an intermediate for obtaining a compound of the general formula (I) or (II) may also be obtained by electrochemical reduction besides the Na-reduction method described above.

Preferred compounds among those represented by the aforesaid general formulae (I) and (II) are illustrated as follows, but the present invention should not of course be limited thereto.

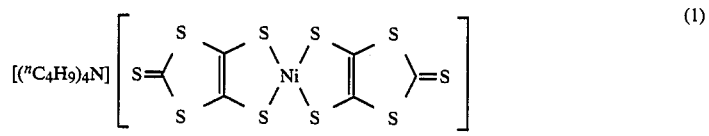

(1)

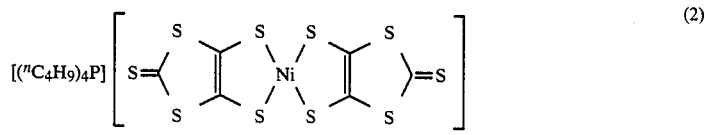

(2)

-continued
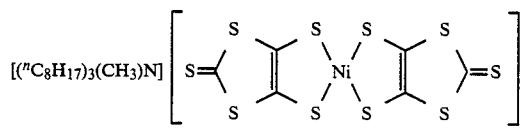 (3)
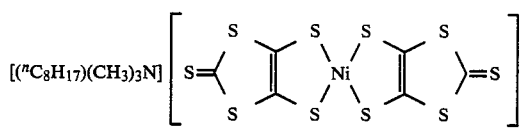 (4)
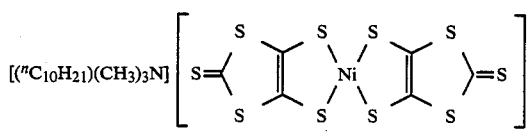 (5)
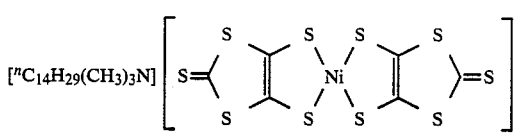 (6)
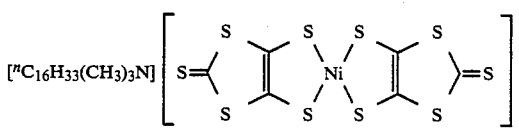 (7)
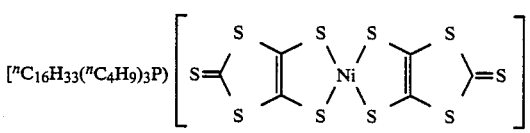 (8)
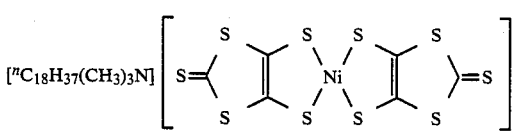 (9)
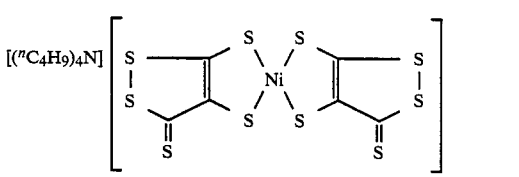 (10)
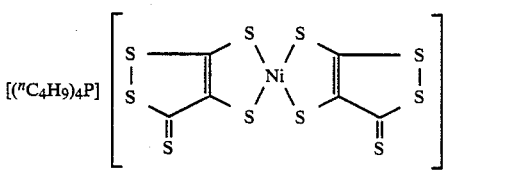 (11)
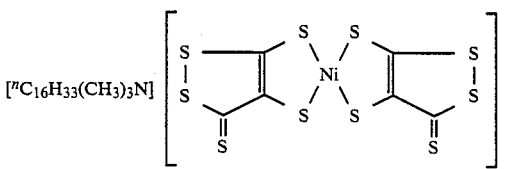 (12)

-continued
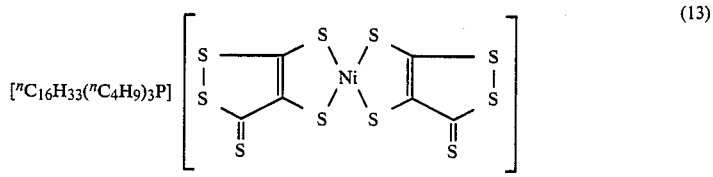
(13)
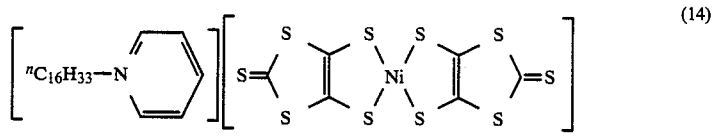
(14)
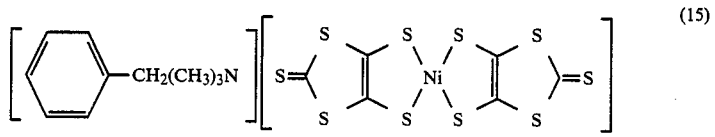
(15)
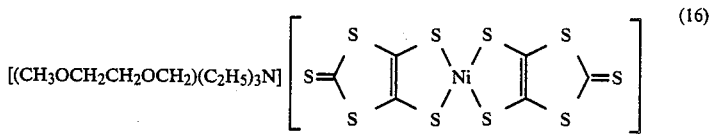
(16)
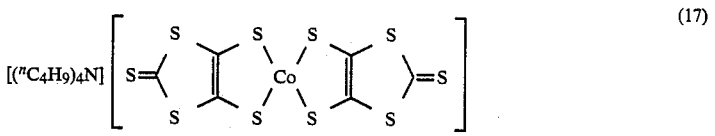
(17)
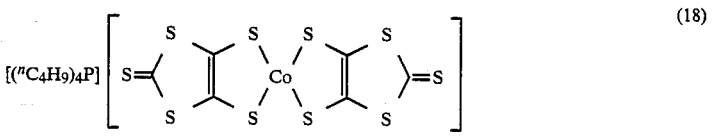
(18)
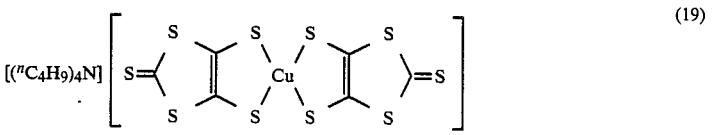
(19)
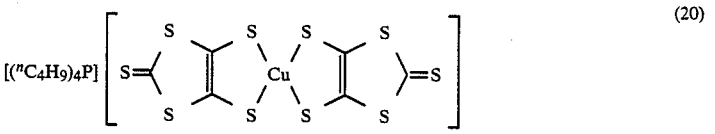
(20)
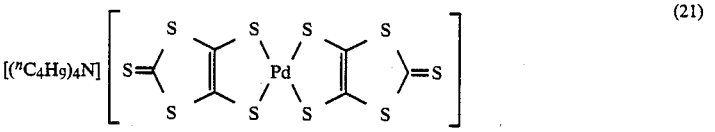
(21)
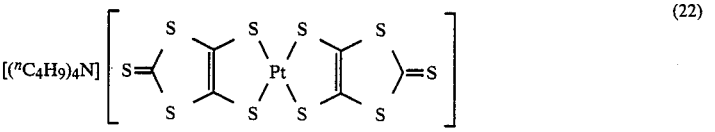
(22)

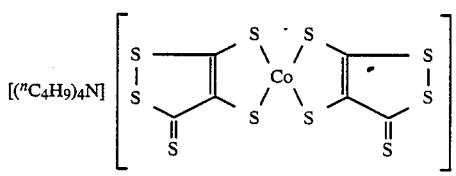

(23)

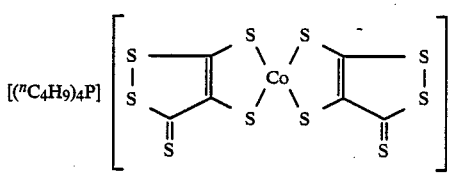

(24)

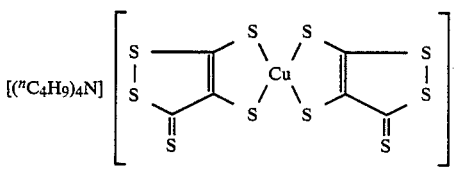

(25)

There is no special limitation about a dye to be contained in the recording layer of the optical recording medium of the present invention. Any dye belonging, for example, to cyanine type, thiazolopyrimidine type, azaazulene type, azulene type, phthalocyanine type, pyrylium or thiapyrylium type, squalium type, quinone type, indoaniline type, naphthalocyanine type, anthraquinone type, azo type, triphenylmethane type, azomethine type, styryl type, pyrazoline type or aminobenzene type may be used. Preferred dyes are those of cyanine type, thiazolopyrimidine type, azaazulene type, azulene type, phthalocyanine type, pyrylium or thiapyrylium type, squalium type, quinone type and indoaniline type, and particularly preferred dyes are those of cyanine type and quinone type.

Preferred dyes among those of cyanine type include compounds represented by the following general formula as disclosed in J.P. KOKAI No. 59-178295.

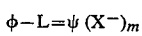

$\phi-L=\psi\ (X^-)_m$ wherein $\phi$ and $\psi$ respectivley represent a 5-membered or 6-membered heterocyclic group, and the heterocycle may form a condensed ring together with a benzene ring, a naphthalene ring, or a 5-, 6- or 7-membered heterocycle. The hetero atoms include O, N, S, Se and Te, preferably O, N and S. L represents a linking group for forming a mono-, di-, tri- or tetra-carbocyanine dye. X represents an anion, provides a negative electric charge necessary for balancing the electric charge of the molecule, and may form an inner salt by linkage onto $\phi$ or $\psi$. m represents 0 or 1.

Particularly preferred dyes among the above-mentioned cyanine dyes are those wherein $\phi$ and $\psi$ are respectivley a group represented by the general formula

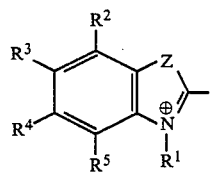

wherein Z represents

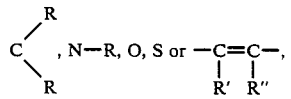

R, R', R" and $R^1$ respectively represent a substituted or unsubstituted alkyl or aryl group, $R^2$, $R^3$, $R^4$ and $R^5$ respectively represent a hydrogen atom or a substituent such as an alkyl group, an aryl group, a heterocyclic group, a halogen atom, an alkoxy group, an alkylthio group, an alkyloxycarbonyl group, an alkylcarbonyloxy group or a carboxylic acid group, and $R^2$ and $R^3$, $R^3$ and $R^4$, $R^4$ and $R^5$, $R^5$ and $R^1$, R and R, and R' and R" may respectivley combine to form a ring; and L is a group represented by the general formula

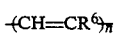

$+CH=CR^6)_n$ wherein $R^6$ is a hydrogen atom, an alkyl group, a phenyl group or a chlorine atom, and n represents an integer of 0 to 3.

Examples of preferred thiazolopyrimidine type cyanine dyes include compounds represented by the following general formula as disclosed in Japanese patent application No. 61-178504.

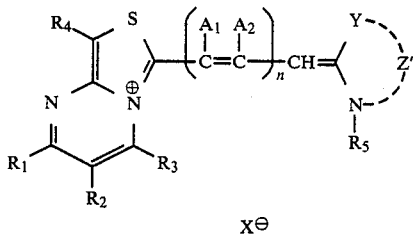

$X^\ominus$ wherein $A_1$ and $A_2$ respectively independently represent a hydrogen atom, a halogen atom, a substituted or unsubstituted alkoxy group, a substituted or unsubstituted aryloxy group, a cyano group, a substituted or unsubstituted alkyl group, a substituted or unsubstituted aryl group, or a substituted or unsubstituted aralkyl group; Y represents $NR^6$ (wherein $R^6$ represents a substituted or unsubstituted alkyl group, a substituted or unsubstituted aryl group, or a substituted or unsubstituted aralkyl grup), O, S, Se or Te; $Z'$ represents an atomic group necessary for forming a 5-membered heterocycle; $R_1$, $R_2$, $R_3$ and $R_4$ respectively represent a substituted or unsubstituted alkyl group, a substituted or unsubstituted aryl group, a substituted or unsubstituted aralkyl group or a hydrogen atom; $R_5$ represents a substituted or unsubstituted alkyl group, a substituted or unsubstituted aryl group, or a substituted or unsubstituted aralkyl group, or $R_5$ may combine with $Z'$ to represent an atomic group necessary for forming a 6-membered heterocycle; n represents 0, 1 or 2; and X represents an anion, and X may be linked onto $R_1$, $R_2$, $R_3$, $R_4$, $R_5$, $R_6$, $Z'$, $A_1$ or $A_2$ to form an inner salt.

Further, examples of preferred azaazulene type dyes include compounds represented by the following general formula as disclosed in Japanese patent application No. 61-184500.

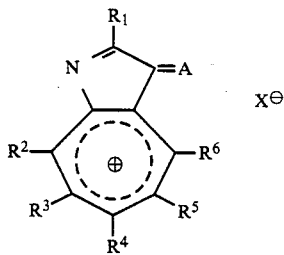

$X^\ominus$ wherein $R_1$, $R_2$, $R_3$, $R_4$, $R_5$ and $R_6$ respectively represent a hydrogen atom, a halogen atom or a monovalent organic residue; A represents a divalent organic residue linked by a double bond; and $X^\ominus$ represents an anionic residue, provided that $X^\ominus$ exists in a number necessary for neutralizing a positive electric charge, and may be linked onto $R_1$, $R_2$, $R_3$, $R_4$, $R_5$, $R_6$ or A to form an inner salt, and by at least one combination among those of $R_2$ and $R_3$, $R_3$ and $R_4$, $R_4$ and $R_5$, and $R_5$ and $R_6$, a substituted or unsubstituted aromatic carbon ring or aromatic heterocycle may be formed.

Examples of other preferred dyes are disclosed in J.P. KOKAI Nos. 57-212639, 58-36490, 58-112790, 58-112792, 58-114989, 58-125246, 59-24692, 59-55794, 59-55795, 59-67092, 59-71895, 59-81194, 59-83695, 59-124045, 59-124897, 59-188854, 59-85791, 59-150795, 59-202892, 60-19586, 60-19587, 60-47069, 60-78787, 60-83236, 60-83892, 60-162691, 60-163243, 60-179292, 60-182029, 60-500329, 61-26044, 61-27551, 61-47295, 61-226035, and the like.

It is also possible in the present invention to use a composite of a cation of the dye and an anion of the quencher.

An optical recording medium of the present invention is composed of a support carrying thereon a dye and the aforementioned quencher. The quencher is generally used in an amount of 0.05 to 12 moles, preferably 0.1 to 1.2 moles per 1 mole of the above-mentioned dye.

Though the quencher is preferably contained in the dye film recording layer, it may be contained in another layer different from the reocrding layer as disclosed below. It is possible to provide a subbing layer on the support, or a protective layer or reflective layer on the recording layer in the optical recording medium of the present invention.

Known supports may optionally be used as a support. Typical examples thereof are glasses and plastics such as acryls, polycarbonates, polysulfones, polyimides, polyesters and the like. The support may be used in various shapes such as disc-like, card-like, sheet-like and roll film-like shapes.

A groove may be formed on the glass or plastic support in order to make tracking during recording easier. Further, a subbing layer of a plastic binder, or an inorganic oxide, an inorganic sulfide or the like may be provided on the glass or plastic support. A subbing layer having a thermal conductivity lower than the support is preferable. Further, it is also possible to make two recording media facing with each other so that both recording layers are inside, namely to make two recording media so-called air sandwich structure.

The recording layer in the present invention may be formed by dissolving a dye and a quencher in an organic solvent (for example, methanol, ethanol, isopropyl alcohol, dichloromethane, dichloroethane or acetone), and, if necessary, a proper binder (for example, PVA, PVP, polyvinyl butyral, polycarbonate, nitrocellulose, polyvinyl formal, methyl vinyl ether, chlorinated paraffin, maleic anhydride copolymer, styrene-butadiene copolymer and xylene series resin), and applying the solution (for example by spin coating) on a support. The recording layer may also be formed by co-depositing a dye and a quencher on a support, or by vacuum-depositing a dye and then applying a quencher. When a binder is used, it is preferable to use it in an amount of 0.01 to 2 times the weight of the dye. Further, it is also possible to form a thin film according to Langmuir-Blodgett's technique using a dye.

It is possible to provide one or more of the recording layers in the present invention.

An antioxidant or a discoloration inhibitor may be contained in the recording layer or in a layer adjacent thereto in order to inhibit deterioration of the dye.

The film thickness of the recording layer is usually in the range of 0.01 to 2 $\mu$m, preferably in the range of 0.02 to 0.8 $\mu$m. In the case of reflection reading, it is especially preferable that the thickness is an odd number times the $\frac{1}{4}$ of the laser wave length used for reading.

When a layer for reflecting a semiconductor laser, a He-Ne laser or the like is provided, the optical recording medium of the present invention may be made either by providing a reflecting layer on a support and then providing a recording layer on the reflecting layer in such a manner as aforementioned, or by providing a recording layer on a support and then providing a reflecting layer thereon.

The reflecting layer may be provided in such a manner as described below or by a sputtering method, an ion plating method or the like.

For example, a solution which is prepared by dissolving a metal salt or a metal complex salt in a water soluble resin (PVP, PVA or the like) and further adding a reducing agent thereto is applied on a support and the resulting support is dried while heating at 50° to 150° C., preferably 60° to 100° C., whereby a reflecting layer is provided thereon.

The metal salt or the metal complex salt is used in a weight ratio of 0.1 to 10, preferably 0.5 to 1.5 based on the resin. Further, as for the thickness of the recording layer, it is proper that the thickness of the metal particle reflecting layer is in the range of 0.01 to 0.1 $\mu$m and that of the light absorption layer is in the arrange of 0.01 to 1 $\mu$m.

Usable metal salts and metal complex salts include sivler nitrate, potassium silver cyanide, potassium gold cyanide, silver ammine complex, silver cyan complex, gold salt or gold cyan complex and the like. Usable reducing agents include formalin, tartaric acid, a tartrate, a reducing agent, a hypophosphite, sodium borohydride, dimethylamine borane and the like. The reducing agent may be used in the range of 0.2 to 10 moles, preferably 0.5 to 4 moles per 1 mole of the metal salt or the metal complex salt.

In the optical recording medium of the present invention, recording of information is conducted by irradiating a spot-like high energy beam such as a laser (for example, a semiconductor laser and a He-Ne laser) on the recording layer through the support or from the opposite side of the support. That is to say, light absorbed in the recording layer is converted to heat and pits are formed in the recording layer.

On the other hand, reading of information is conducted by irradiating a laser beam with a low power of the threshold value energy or less for recording, and detecting the difference in the quantity of reflected light or the quantity of transmitted light between pitted areas and unpitted areas.

The present invention is further explained in detail below according to examples, but the scope of the present invention should not be limited thereto.

REFERENCE EXAMPLE 1

Synthesis of exemplified compound (34)

(1-1) Synthesis of bis(tetraethylammonium)bis(1,3-dithiol-2-thione-4,5-dithiolato)zinc complex All reaction procedures were conducted under an argon atmosphere. 23 g of sodium was cut into small pieces and dispersed in 180 ml of carbon disulfide, followed by dropwise addition at a slow speed of 200 ml of dimethylformamide thereto with stirring. During the dropwise addition, caution should be given so that the mixture does not rapidly generate heat. After the dropwise addition of dimethylformamide, the mixture was gently heated to be refluxed for 24 hours with caution. After completion of the reaction the unreacted sodium was removed by filtration. Then, 50 ml of ethanol was added to the filtrate, and the mixture was stirred at room temperature for 2 hours. Carbon disulfide was distilled away from this solution at room temperature under reduced pressure. Then, 300 ml of water was slowly added dropwise thereto and the resulting solution was filtered.

Separately in advance, 20 g of zinc chloride was dissolved in 500 ml of methanol and 500 ml of concentrated ammonia water was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was recovered by filtration and air-dried to obtain the captioned zinc complex.

(1-2) Synthesis of 4,5-bis(benzoylthio)-1,3-dithiol-2-thione 22 g of the zinc complex obtained in (1-1) was dissolved in 500 ml of acetone and filtered. 150 ml of benzoyl chloride was added to the filtrate with stirring to immediately form a yellow precipitate. The precipitate was recovered by filtration, washed with water and air-dried to obtain 16 g of the captioned compound.

(1-3) Synthesis of exemplified compound (34)

9.2 g of the bis(benzoylthio) compound obtained in (1-2) was dissolved in 50 ml of methanol. Then, 6.3 g of a 28% methanol solution of sodium methoxide was added thereto, followed by stirring for 10 minutes. To this solution was added the solution of 2.4 g of nickel chloride hexahydrate in 50 ml of methanol, and the mixture was stirred at room temperature for 30 minutes. To the resulting solution was added the soluiton of 8.5 g of tetrabutylphosphonium bromide in 100 ml of methanol to form immediately a black precipitate. The mixture was stirred for additional 20 minutes and filtered. The solid was washed with acetone, air-dried and recrylstallized from acetone-isopropyl alcohol to obtain the captioned comound. Yield 3.8 g.

REFERENCE EXAMPLE 2

Synthesis of exemplified compound (2)

1 g of the nickel complex obtained in (1-3) was dissolved in 60 ml of acetone, and 30 ml of acetic acid was added thereto. The mixture was stirred for 3 hours and the solvent was distilled off to form black crystals, which was then recrystallized from acetone-methanol to obtain the desired exemplified compound (2). Yield 0.4 g, M.P. 185° C., $\lambda_{max}$: 1125 nm, $\epsilon_{max}$: 2.51×10$^4$ (in CH$_2$Cl$_2$)

REFERENCE EXAMPLE 3

Synthesis of exemplified compound (42)

(3-1) Synthesis of bis(tetraethylammonium) bis(1,2-dithiol-3-thione-4,5-dithiolato) zinc complex All reaction procedures were conducted under an argon atmosphere. 23 g of sodium was cut into small pieces and dispersed in 180 ml of carbon disulfide, followed by slow dropwise addition of 200 ml of dimethylformamide thereto with stirring. During the dropwise addition, caution was given so that the mixture does not rapidly generate heat. After the dropwise addition of dimethylformamide, the mixture was gently heated to be refluxed for 24 hours with caution. After completion of the reaction the unreacted sodium was removed by filtration. Carbon disulfide was distilled away from the filtrate at room temperature under reduced pressure. The thus obtained solution was stirred in an oil bath at 140° C. for 2 hours, allowed to be cooled to room temperature, stirred at room temperature for 2 hours after addition of 50 ml of ethanol, and filtered after slow addition of 300 ml of water.

Separately in advance, 20 g of zinc chloride was dissolved in 500 ml of methanol and 500 ml of concentrated ammonia was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was recovered by filtration and air-dried to obtain the captioned zinc complex.

(3-2) Synthesis of 4,5-bis(benzoylthio)-1,2-dithiol-3-thione 18 g of the zinc complex obtained in (3-1) was dissolved in 500 ml of acetone and the solution was filtered. 150 ml of benzoyl chloride was added to the filtrate with stirring to immediately deposit a yellow precipitate, which was recovered by filtration, washed with water and air-dried to obtain 12 g of the captioned compound.

(3-3) Synthesis of exemplified compound (42)

9.2 g of the bis(benzoylthio) compound obtained in (3-2) was dissolved in 50 ml of methanol. 6.3 g of a 28% sodium methoxide solution in methanol was added thereto, followed by stirring for 10 minutes. A solution of 2.4 g of nickel chloride hexahydrate in 50 ml of methanol was added to the resulting solution, and the mixture was stirred at room temperature for 30 minutes. Then, a solution of 7.5 g of tetrabutylammonium bromide in 100 ml of methanol was added thereto to immediately deposit a black precipitate. The mixture was stirred for additional 20 minutes and filtered. The solid was washed with water, air-dried, and recrystallized from acetone-isopropyl alcohol to obtain the captioned compound. Yield 2.8 g.

REFERENCE EXAMPLE 4

Synthesis of exemplified compound (10)

1 g of the nickel complex obtained in (3-3) was dissolved in 60 ml of acetone, 30 ml of acetic acid was added thereto, and the mixture was stirred for 3 hours. The solvent was distilled away to deposit black crystals, which was recrystalled from acetone-methanol to obtain the captioned exemplified compound (10). Yield 0.3 g, M.P. 207° C., $\lambda_{max}$: 1138 nm, $\epsilon_{max}$: $2.50 \times 10^4$

EXAMPLE 1

Dye (I), quencher (II) and an optional binder, respectively represented in Table 1 were dissolved in a mixed solvent of methanol, methyl ethyl ketone and dichloroethane in a proper mutual ratio. A surface hardened acrylic plate was coated with the solution to a thickness of 0.1 μm, and dried. The weight ratio of the dye and the quencher was 3:1, and in case of using a binder, the weight thereof was 1/5 of the dye.

Then, a signal of 0.4M Hz was recorded on the thus obtained optical recording medium under the condition of 6 mW on the irradiated surface and a beam diameter of 1.6 μm using a semiconductor laser having a wave length of 830 nm, whereby pits having the diameter of 1.0 μm were formed with irradiation for 0.3μ second. A weak laser beam was applied to the recording areas, the signal was regenerated, and a C/N ratio was determined. Then, a laser beam of 1 mW (830 nm) was irradiated for 10 minutes at a pulse of 1μ second and at a width of 3 kHz, the C/N ratio was determined, and then the decrease in C/N ratio as compared with the C/N ratio before the irradiation of the laser beam was calculated and was used as a measure of deterioration during reproduction. Further, the C/N ratio after allowing the recording medium to stand for 30 days at 60° C. under 90% RH was compared with C/N ratio before preservation, which was used as a measure of stability in preservation.

When the dye was D, F, G, I or J, each experiment was conducted using a semiconductor laser of 780 nm.

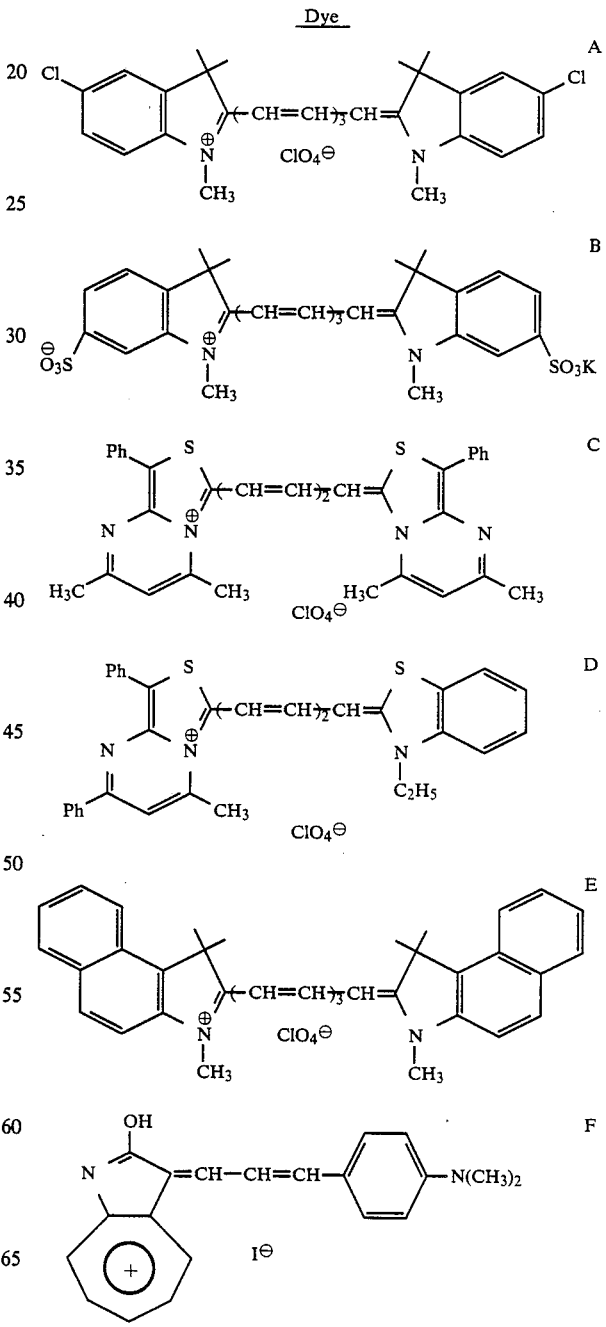

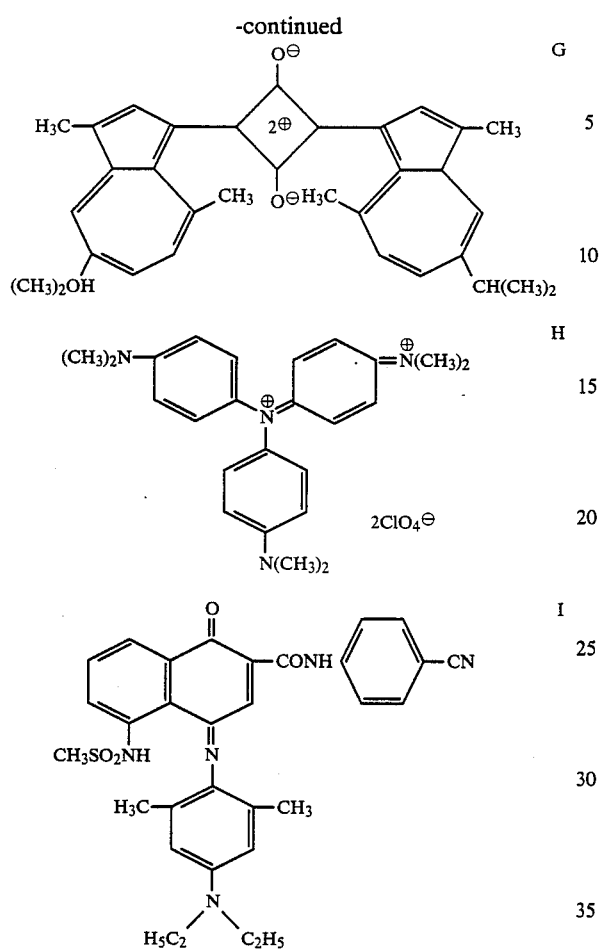
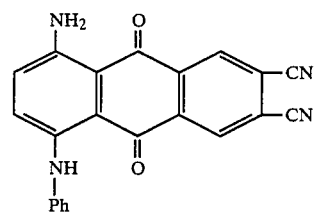
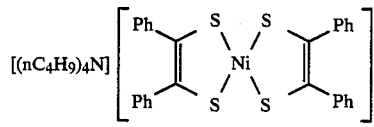
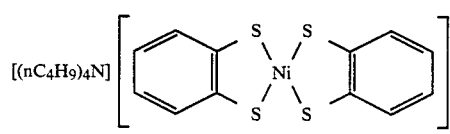
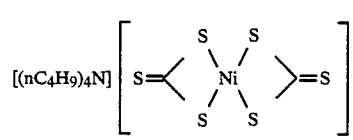
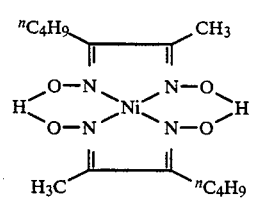

TABLE 1

| Sample No. | Dye | Quencher | Binder | C/N ratio (dB) | Deterioration during reproduction (%) | Deterioration during preservation (%) |
|---|---|---|---|---|---|---|
| 1* | A | — | — | 53 | −48 | −20 |
| 2* | A | — | Nitrocellulose | 50 | −47 | −19 |
| 3* | A | a | — | 51 | −35 | −17 |
| 4* | A | a | Nitrocellulose | 50 | −28 | −17 |
| 5* | A | b | — | 53 | −30 | −16 |
| 6* | A | c | — | 52 | −33 | −17 |
| 7* | A | d | — | 52 | −35 | −15 |
| 8 | A | (1) | — | 53 | −21 | −9 |
| 9 | A | (1) | Nitrocellulose | 51 | −20 | −9 |
| 10 | A | (2) | — | 52 | −20 | −10 |
| 11 | A | (33) | — | 52 | −19 | −9 |
| 12* | B | a | — | 53 | −33 | −18 |
| 13* | B | a | Nitrocellulose | 52 | −31 | −17 |
| 14 | B | (1) | — | 53 | −20 | −10 |
| 15 | B | (1) | Nitrocellulose | 52 | −20 | −9 |
| 16 | B | (2) | — | 54 | −19 | −8 |
| 17 | B | (33) | — | 53 | −20 | −9 |
| 18* | C | b | — | 53 | −15 | −8 |
| 19* | C | b | Nitrocellulose | 52 | −14 | −8 |
| 20 | C | (1) | — | 53 | −17 | −6 |
| 21 | C | (2) | — | 53 | −8 | −7 |
| 22 | C | (2) | Nitrocellulose | 51 | −7 | −6 |
| 23 | C | (33) | — | 53 | −7 | −7 |
| 24* | D | c | — | 52 | −16 | −9 |
| 25 | D | (1) | — | 53 | −8 | −6 |
| 26 | D | (2) | — | 53 | −7 | −6 |
| 27 | D | (33) | — | 53 | −7 | −6 |
| 28* | E | a | — | 52 | −33 | −16 |
| 29 | E | (1) | — | 53 | −19 | −10 |
| 30 | E | (2) | — | 52 | −20 | −9 |
| 31 | E | (33) | — | 53 | −19 | −9 |

TABLE 1-continued

| Sample No. | Dye | Quencher | Binder | C/N ratio (dB) | Deterioration during reproduction (%) | Deterioration during preservation (%) |
|---|---|---|---|---|---|---|
| 32* | F | a | — | 52 | −16 | −10 |
| 33 | F | (1) | — | 52 | −7 | −6 |
| 34 | F | (2) | Polyvinyl formal | 51 | −7 | −6 |
| 35 | F | (33) | — | 54 | −8 | −7 |
| 36* | G | a | — | 52 | −28 | −17 |
| 37 | G | (1) | — | 52 | −20 | −10 |
| 38 | G | (2) | — | 53 | −19 | −9 |
| 39 | G | (33) | Polyvinyl butyral | 52 | −20 | −9 |
| 40* | H | b | — | 38 | −30 | −18 |
| 41 | H | (1) | — | 39 | −19 | −10 |
| 42 | H | (34) | — | 38 | −20 | −10 |
| 43* | I | a | — | 45 | −29 | −17 |
| 44* | I | a | Nitrocellulose | 43 | −28 | −16 |
| 45* | I | b | — | 44 | −28 | −17 |
| 46 | I | (1) | — | 45 | −13 | −10 |
| 47 | I | (2) | Chlorinated paraffin | 41 | −14 | −11 |
| 48 | I | (33) | — | 43 | −14 | −10 |
| 49 | I | (34) | — | 44 | −13 | −9 |
| 50* | J | a | — | 36 | −19 | −18 |
| 51 | J | (1) | — | 38 | −14 | −13 |

Symbol * at the rigid shoulder of Sample No. shows a comparative example.
Dye film in Samples 50 and 51 was formed by depositing the quencher on the support and then depositing the dye thereon.

TABLE 2

| Sample No. | Dye[a] | Quencher[a] | Binder | C/N ratio (dB) | Deterioration during reproduction (%) | Deterioration during preservation (%) |
|---|---|---|---|---|---|---|
| 201* | K | — | — | 54 | −47 | −19 |
| 202* | K | — | Nitrocellulose | 53 | −46 | −18 |
| 203* | K | a | — | 50 | −34 | −17 |
| 204* | K | a | Nitrocellulose | 50 | −29 | −17 |
| 205* | K | b | — | 52 | −30 | −16 |
| 206* | K | c | — | 52 | −34 | −15 |
| 207* | K | d | — | 51 | −32 | −16 |
| 208 | K | (11) | — | 54 | −18 | −8 |
| 209 | K | (11) | Chlorinated paraffin | 52 | −17 | −8 |
| 210 | K | (11) | Nitrocellulose | 52 | −17 | −8 |

[a]Quenchers a to d are the same as those described in Example 1 and dye K is a compound of the following structure.
Symbol * represents a comparative example.

Dye K

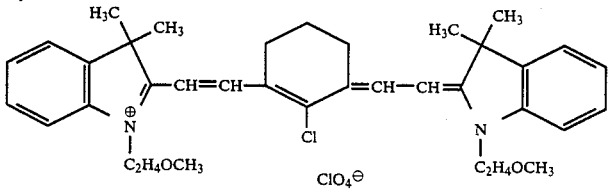

It is seen from the results shown in Tables 1 and 2 that the optical recording medium of the present invention has a smaller deterioration during reproduction, in other words is superior in reading durability, and is at the same time superior in stability in preservation, as compared with the usual optical recording medium.

What we claim is:

1. An optical recording medium capable of being written upon by a laser which causes changes in the absorption of a recording layer, or which is capable of being read by a laser, comprising a support having thereon said recording layer comprising a dye and at least one quencher compound represented by formula (I) or (II):

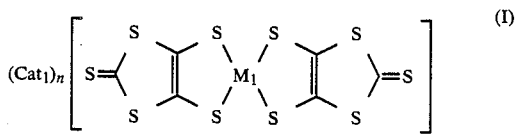

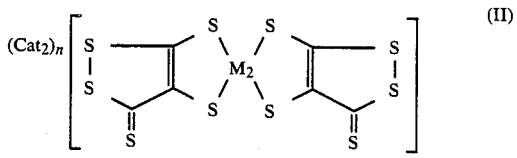

wherein $(Cat_1)$ and $(Cat_2)$ respectively represent a cation necessary for making the compound neutral, $M_1$ and $M_2$ respectively represent nickel, copper, cobalt, palladium or platinum, and n represents 1 or 2.

2. The optical recording medium of claim 1, wherein ($Cat_1$) and/or ($Cat_2$) are respectively an alkali metal ion, an alkaline earth metal ion or $NH_4^+$.

3. The optical recording medium of claim 1, wherein ($Cat_1$) and/or ($Cat_2$) are respectively any one of ions represented by the following general formula (III-a), (III-b), (III-c), (III-d) or (III-e):

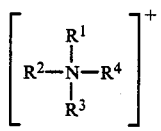 (III-a)

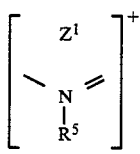 (III-b)

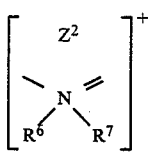 (III-c)

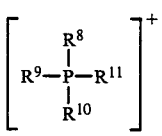 (III-d)

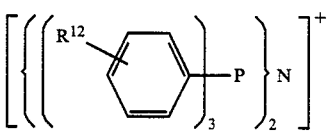 (III-e)

wherein, $R^1$, $R^2$, $R^3$, $R^4$, $R^5$, $R^6$, $R^7$, $R^8$, $R^9$, $R^{10}$, $R^{11}$ and $R^{12}$ respectively represent a substituted or unsubstituted alkyl group having 1 to 20 carbon atoms, or a substituted or unsubstituted aryl group having 6 to 14 carbon atoms, and $Z^1$ and $Z^2$ respectively represent a nonmetal atomic group which forms five-membered or six-membered rings together with a nitrogen atom or a phosphorus atom in each formula.

4. The optical recording medium of claim 3, wherein the aryl group is a phenyl group, a tolyl group or an α-naphthyl group.

5. The optical recording medium of claim 3, wherein the substituents of the alkyl group and the aryl group are respectively a cyano group, a hydroxyl group, an alkyl group having 1 to 20 carbon atoms, an aryl group having 6 to 14 carbon atoms, an acyloxy group having 2 to 20 carbon atoms, an alkoxy group having 1 to 6 carbon atoms, an aryloxy group, an aralkyl group, an alkoxycarbonyl group, an aryloxycarbonyl group, an acyl group, an acylamino group, a carbamoyl group, an alkylsulfonylamino group, a sulfamoyl group or a sulfonyl group.

6. The optical recording medium of claim 3, wherein the 5-membered ring or the 6-membered ring in the definition of $Z_1$ and $Z_2$ is a pyridine ring, an imidazole ring, a pyrrole ring, a 2-pyrroline ring, a pyrrolidine ring, a piperidine ring, a pyrazole ring, a pyrazoline ring or an imidazoline ring.

7. The optical recording medium of claim 1, wherein the dye is a dye belonging to any one of cyanine type, thiazolopyrimidine type, azaazulene type, azulene type, phthalocyanine type, pyrylium or thiapyrylium type, squalium type, quinone type, indoaniline type, naphthalocyanine type, anthraquinone type, azo type, triphenylmethane type, azomethine type, styryl type, pyrazoline type or aminobenzene.

8. The optical recording medium of claim 7, wherein the dye is a dye belonging to any one of cyanine type, thiazolopyrimidine type, azaazulene type, azulene type, phthalocyanine type, pyrylium or thiapyrylium type, squalium type, quinone type or indoaniline type.

9. The optical recording medium of claim 8, wherein the dye is a dye belonging to cyanine type or quinone type.

10. The optical recording medium of claim 9, wherein the dye of the cyanine type is a dye represented by the following general formula:

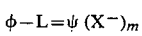

wherein φ and ψ respectively represent a 5-membered or a 6-membered heterocyclic group, the heterocycle may form a condensed ring together with a benzene ring, a naphthalene ring, or a 5-, 6- or 7-membered heterocycle, and the hetero atoms include O, N, S, Se or Te; L represents a linking group for forming a mono-, di-, tri- or tetra-carbocyanine dye; X represents an anion providing a negative electric charge necessary for balancing the electric charge of the molecule, and may form an inner salt by linkage onto φ or ψ; and m represents 0 to 1.

11. The optical recording medium of claim 10, wherein φ and ψ are respectively a group represented by the general formula

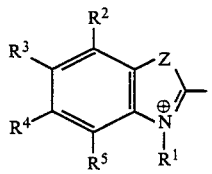

wherein Z represents

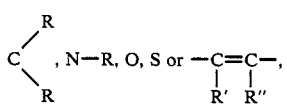

R, R′, R″ and $R^1$ respectively represent a substituted or unsubstituted alkyl or aryl group, $R^2$, $R^3$, $R^4$ and $R^5$ respectively represent a hydrogen atom, an alkyl group, an aryl group, a heterocyclic group, a halogen atom, an alkoxy group, an alkylthio group, an alkyloxycarbonyl group, an alkylcarbonyloxy group or a carboxylic acid group, and $R^2$ and $R^3$, $R^3$ and $R^4$, $R^4$ and $R^5$, $R^5$ and $R^1$, R and R, and R′ and R″ may respectively combine to form a ring; and L is a group represented by the general formula

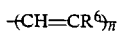

wherein $R^6$ is a hydogen atom, an alkyl group, a phenyl group or a chlorine atom; and n represents an integer of 0 to 3.

12. The optical recording medium of claim 9, wherein the dye of cyanine type is a dye represented by the following general formula:

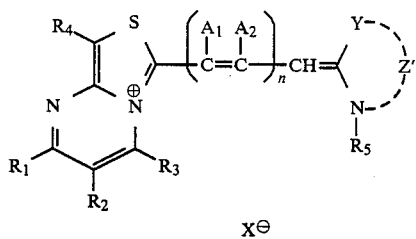

wherein $A_1$ and $A_2$ respectively represent a hydrogen atom, a halogen atom, a substituted or unsubstituted alkoxy group, a substituted or unsubstituted aryloxy group, a cyano group, a substituted or unsubstituted alkyl group, a substituted or unsubstituted aryl group, or a substituted or unsubstituted aralkyl group; Y represents $NR^6$ (wherein $R^6$ represents a substituted or unsubstituted alkyl group, a substituted or unsubstituted aryl group, or a substituted or unsubstituted aralkyl group), O, S, Se or Te; Z' represents an atomic group necessary for forming a 5-membered heterocycle; $R_1$, $R_2$, $R_3$ and $R_4$ respectively represent a substituted or unsubstituted alkyl group, a substituted or unsubstituted aryl group, a substituted or unsubstituted aralkyl group or a hydrogen atom; $R_5$ represents a substituted or unsubstituted alkyl group, a substituted or unsubstituted aryl group, or a substituted or unsubstituted aralkyl group, or $R_5$ may combine with Z' to represent an atomic group necessary for forming a 6-membered heterocycle; n represents 0, 1 or 2; and X represents an anion, and X may be linked onto $R_1$, $R_2$, $R_3$, $R_4$, $R_5$, $R_6$, Z', $A_1$ or $A_2$ to form an inner salt.

13. The optical recording medium of claim 1, wherein the quencher is used in an amount of 0.05 to 12 moles per 1 mole of the dye.

14. The optical recording medium of claim 13, wherein the quencher is used in an amount of 0.1 to 1.2 moles per 1 mole of the dye.

15. The optical recording medium of claim 1, wherein a subbing layer is provided on the support, or a protective layer or a reflective layer is provided on said recording layer.

16. The optical recording medium of claim 1, wherein the film thickness of a recording layer composed of the dye, or the dye and the quencher is 0.01 to 2 μm.

17. The optical recording medium of claim 16, wherein the film thickness of the recording layer is 0.02 to 0.8 μm.

18. The optical medium of claim 1, wherein the film thickness of a recording layer is an odd number times ¼ of the laser wave length used for reading.

* * * * *